United States Patent [19]

Smith

[11] 4,135,445

[45] Jan. 23, 1979

[54] ADJUSTABLE RAIL ASSEMBLY FOR ACCURATE BALER PLUNGER GUIDANCE

[75] Inventor: Kenneth E. Smith, Strasburg, Pa.

[73] Assignee: Sperry Rand Corporation, New Holland, Pa.

[21] Appl. No.: 710,770

[22] Filed: Aug. 2, 1976

[51] Int. Cl.² .......................... B30B 1/00; B30B 9/38
[52] U.S. Cl. .................................... 100/179; 100/189
[58] Field of Search ............... 100/179, 188, 189, 214, 100/35, 98; 56/341-344

[56] References Cited

U.S. PATENT DOCUMENTS

| 2,720,160 | 10/1955 | Tice et al. | 100/98 |
| 3,059,569 | 10/1962 | Nolt | 100/98 |
| 3,115,823 | 12/1963 | Nolt et al. | 100/142 |
| 3,552,307 | 1/1971 | Venabl | 100/98 R |
| 3,782,275 | 1/1974 | Webster et al. | 100/98 R |

FOREIGN PATENT DOCUMENTS

| 218254 | 11/1958 | Australia | 100/179 |
| 232876 | 2/1961 | Australia | 100/179 |

Primary Examiner—Peter Feldman
Attorney, Agent, or Firm—John B. Mitchell; Frank A. Seemar; Ralph D'Alessandro

[57] ABSTRACT

An elongated guide rail provided on the bale case of a baler is laterally adjustable to a position parallel to the natural straight line path of reciprocatory movement of a plunger within the bale case in order to facilitate accurate guidance of the plunger along its natural path and thereby in substantially parallel alignment with the reciprocatory motion transmitted to the plunger by a drive rod on the baler.

11 Claims, 5 Drawing Figures

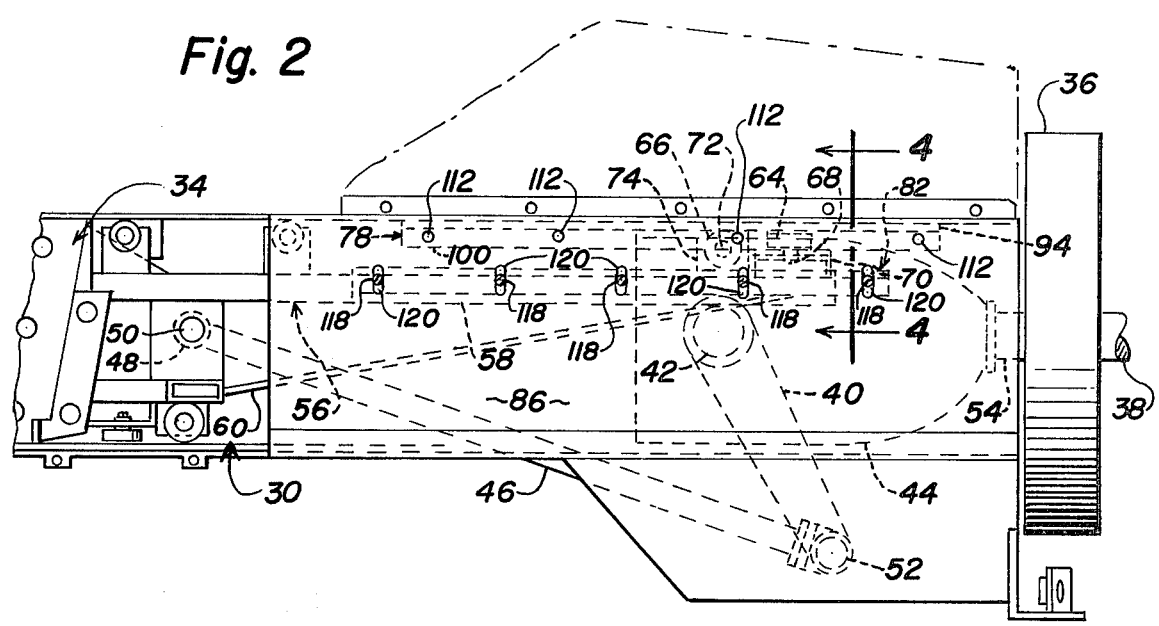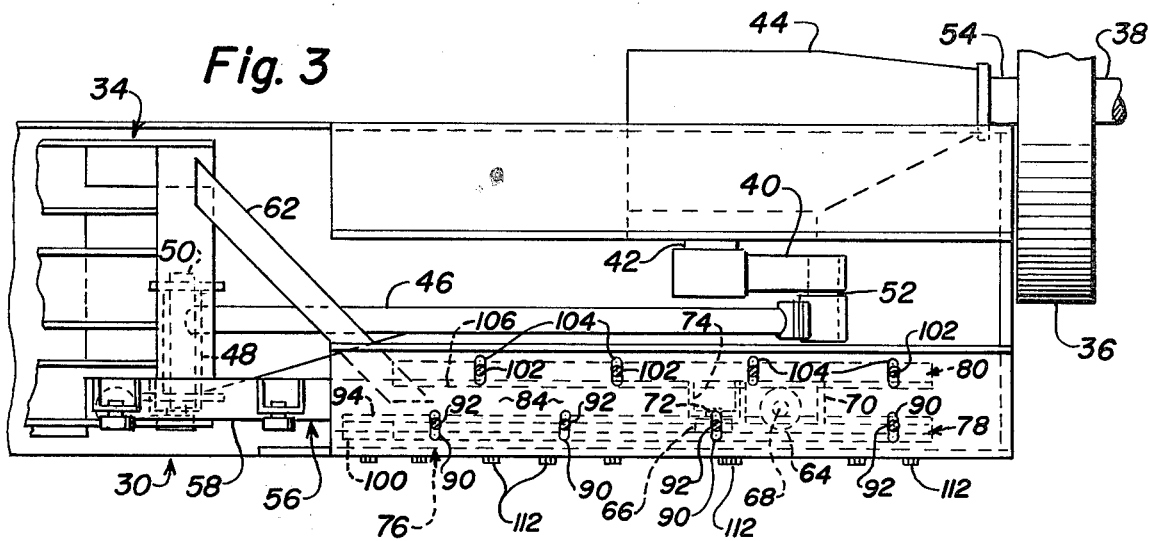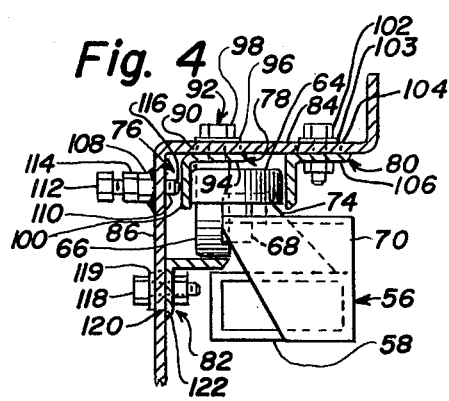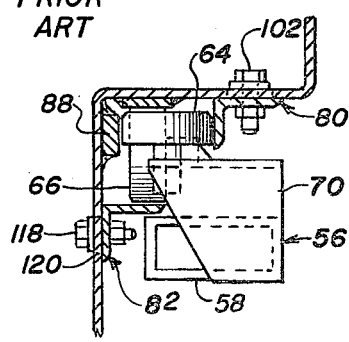

ADJUSTABLE RAIL ASSEMBLY FOR ACCURATE BALER PLUNGER GUIDANCE

BACKGROUND OF THE INVENTION

1. Field of the Invention

The present invention relates generally to a baler and, more particularly, is concerned with an improved adjustable rail assembly for providing accurate guidance of the baler plunger during its reciprocatory movements within the bale case.

2. Description of the Prior Art

A conventional hay baler has a fore-and-aft extending bale case and a plunger reciprocable therein, both of which are generally rectangular in cross section. The bale case extends in the direction of travel of the baler across the field and has an inboard side wall provided with an inlet feed opening for crop material. The baler also has a pickup and feeding mechanism to deliver crop material through the inlet feed opening and into the bale case.

The reciprocating plunger operates to compress the crop material within the bale case to form bales. When the plunger is retracted forwardly, the bale case inlet feed opening is open and operation of the feeding mechanism is timed with the plunger reciprocation to deliver a charge of crop material through the inlet feed opening and into the bale case at that moment. When the plunger moves rearwardly on its working stroke to compress the just delivered charge of material, one side face of the plunger closes the inlet feed opening. However, the operation of the feeding mechanism is coordinated with the rearward stroke of the plunger to insure withdrawal of the feeding mechanism from the opening before it is closed by the plunger. Further, in order to separate the crop material within the feeding area outside the bale case from the material just delivered into the bale case by the feeding mechanism, the plunger is provided with a knife with cooperates with a stationary knife positioned vertically and rearwardly along the bale case inlet opening to sever the material during the rearward stroke of the plunger.

From the brief description just given of the basic operating components of the baler, the central role played by the reciprocating plunger in the formation of crop material bales within the baler's bale case will be readily appreciated. To be able to satisfactorily perform its central role, the plunger must have considerable mass and be reciprocated at relatively high speed, such as seventy or more strokes per minute.

Further, it is necessary to suitably support and accurately guide the plunger through such rapid reciprocatory movements within the bale case and also to provide a close operating clearance between the plunger knife and the stationary bale case knife so that the crop material will be properly sheared with each rearward working stroke of the plunger.

A highly satisfactory roller/track arrangement for adjustably supporting the plunger for reciprocation within the bale case is illustrated and described in U.S. Pat. No. 3,059,569 which issued Oct. 23, 1962 to Edwin B. Nolt and is assigned to the same assignee as the present invention. This arrangement allows the respective knives on the plunger and bale case to be precisely set in a desired operating relationship with respect to one another.

Heretofore, for facilitating accurate guidance of the plunger along its support tracks during its reciprocatory movement within the bale case, a fore-and-aft extending arm assembly has been provided, being attached at its rear end to the right side of the plunger, as illustrated and described in U.S. Pat. No. 3,782,275 which issued Jan. 1, 1974 to Neil W. Webster and is assigned to the same assignee as the present invention. The assembly at its forward end rotatably mounts a pair of orthogonally arranged bearing rollers.

Also, as seen in the aforesaid latter patent, the plunger is reciprocably driven through its interconnection with a rotating crank arm by an elongated connecting rod. The connecting rod has a transversely-extending tubular sleeve at its rear end which is pivotally journalled about a transverse bearing shaft on the plunger. At its forward end, the connecting rod is pivotally connected to the outer, free end of the rotating crank arm. Thus, to reciprocably drive the plunger through its forward and rearward strokes, the circular motion at the forward end of the connecting rod is translated into fore-and-aft reciprocatory linear motion at the rear end of the rod, with the rear end of the rod pivoting vertically about the horizontal axis defined by the plunger transverse bearing shaft.

Consequently, a high level of fore-and-aft directed driving force is imposed on the transverse bearing shaft of the plunger through the sleeve at the rear end of the connecting rod. In order to avoid component failure in this area, it is essential that the arm assembly effectively guide the plunger along a straight line true path in order to maintain the plunger bearing shaft in a generally normal or perpendicular alignment to the connecting rod throughout each reciprocatory stroke of the plunger. If the plunger is not free to travel the length of its stroke in a straight line manner without binding or laterally turning relative to the side walls of the bale case, side pressure or transversely directed forces are imposed on the plunger bearing shaft via the connecting arm sleeve which results in severe wear and potentially early failure thereof. Also, severe wear may occur to the components of the plunger roller/track support arrangement as well as to the connecting rod bearing sleeve.

The tendency toward plunger binding resulting from lateral turning of the plunger from its desired straight line path of travel is due to the fact that the horizontally-disposed one of the bearing rollers on the front end of the arm assembly has heretofore been adjusted to track along a rail fixed on the inboard side of the bale case or on the bale case top adjacent the inboard side whereby the plunger will be guided along a path which is parallel to the bale case side wall. In order to achieve accurate, straight-line guidance of the plunger by the arm assembly and thereby provide the desired perpendicular relationship of the connecting rod to the plunger bearing shaft, the side wall of the bale case and the arm assembly must be more or less perfectly straight or parallel relative to the natural path the plunger wants to take.

However, because of the difficulty encountered in maintaining close tolerances during the construction of certain parts and in avoiding warpage due to localized heating at certain areas of parts during the welding of the parts together, something less than straight parts or ones having the exact desired configurations are produced and frequently the assemblies so fabricated may be slightly warped. In particular, the sides of the bale case may become slightly warped during its fabrication or when other components are welded to it. Also, the arm assembly may warp slightly during its construction and attachment to the plunger.

To summarize, adjustment of the horizontal bearing roller of the arm assembly for travel along a path defined by the side of the bale case or by a rail fixed thereon or adjacent thereto which hasn't been accurately aligned with the natural path of the plunger has frequently resulted in a tendency for the plunger to bind, turn or cock sidewise as it moves through its reciprocatory stroke.

SUMMARY OF THE INVENTION

The present invention obviates the aforementioned tendencies for the plunger to bind or cock sidewise as it moves through its reciprocatory stroke by providing an improved guide rail assembly for the guide arm means fixed to the plunger. The improved rail assembly adopts a novel method and arrangement for presetting the path of reciprocatory movement of the plunger within the bale case so as to insure that the plunger will travel in conformity with its natural straight line path and thereby in substantially parallel alignment with the reciprocatory motion transmitted thereto by the drive rod.

Accordingly, the present invention relates to an improved assembly for guiding the plunger arm means, and thereby the plunger throughout its reciprocatory movement within the baler bale case, which includes rail means mounted on the bale case for guiding the arm means during its reciprocatory movement with the plunger and means for facilitating lateral adjustment of the rail means into parallel correspondence with the natural straight line path of reciprocatory movement of said plunger. Such adjustment of the rail means insures that the plunger will travel in conformity with its natural path and thereby in substantially parallel alignment with the reciprocatory motion transmitted thereto by the baler drive rod.

More particularly, such adjustment in the position of the guide rail means on the bale case is carried out by incrementally moving the plunger through its reciprocatory stroke during which the plunger will take its natural straight line path of travel within the bale case. After each incremental movement of the plunger, the rail means is laterally adjusted into contact with the plunger arm means and then fixed to the bale case at such adjusted position.

Preferably, the rail means includes a pair of laterally spaced apart elongated rails, each having a series of fasteners for attaching the rails at fixed positions on the bale case. Each incremental movement of the plunger positions a guide roller on the plunger arm means adjacent one of the fasteners on the one rail whose position is to be adjusted first. After each incremental plunger movement, the one rail is laterally moved into contact with the guide roller and then the respective fastener adjacent the roller is tightened to secure the one rail to the bale case. Then, the other rail is fastened to the bale case at a predetermined dimension from the one rail so as to confine the guide roller therebetween.

Other advantages and attainments of the improvement provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 2 is an enlarged, fragmentary right side elevational view of the front half of the bale case of the baler of FIG. 1, with part of the bale case omitted in order to more clearly illustrate portions of operative components located therein;

FIG. 3 is a top plan view of the bale case of FIG. 2, with part of the bale case omitted in order to more clearly illustrate operative components located therein;

FIG. 4 is a fragmentary sectional view taken along line 4—4 of FIG. 2, but on a somewhat larger scale than that of FIG. 2, showing the improved guide rail assembly of the present invention; and FIG. 5 is a view similar to FIG. 4, but showing the prior art guide rail assembly.

DETAILED DESCRIPTION OF THE INVENTION

Figure 1:
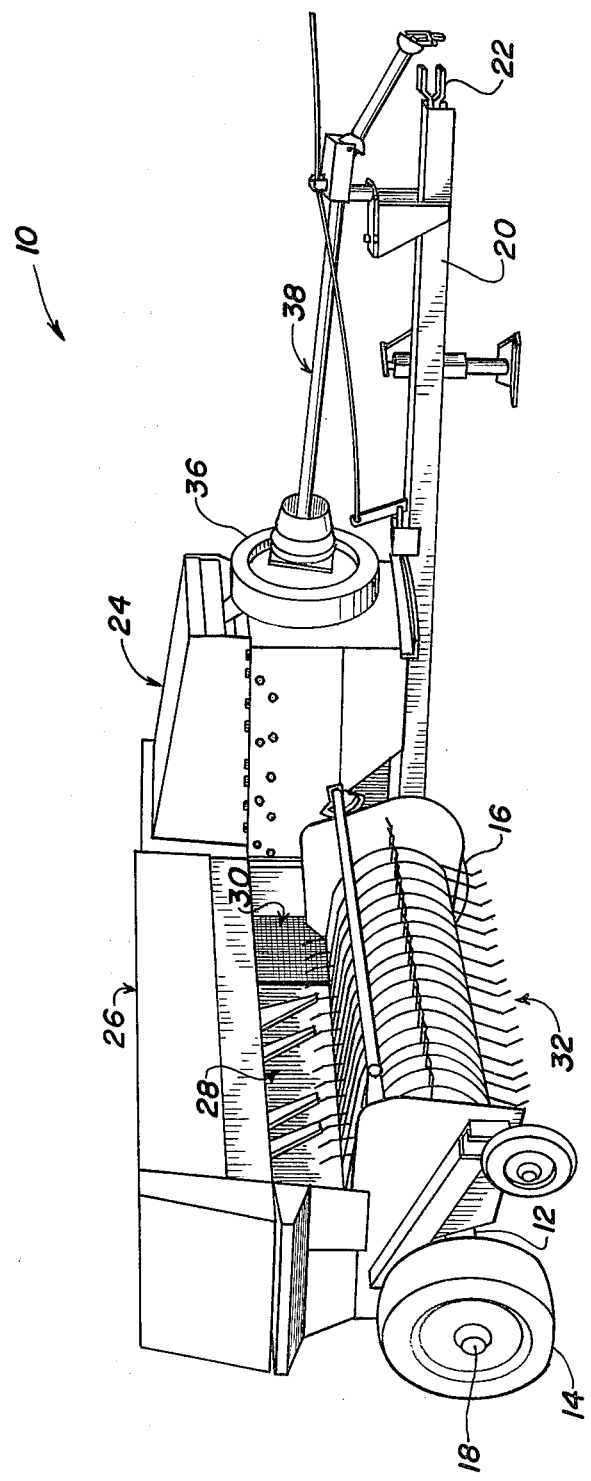
FIG. 1 is a perspective view of a baler embodying the principles of the present invention.

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

In General

Referring now to the drawings, and particularly to FIG. 1, there is shown a hay baler, being indicated generally by numeral 10. The baler 10 includes a frame 12 (partially seen in FIG. 1) supported and made mobile by right and left ground-engaging wheels 14,16 rotatably mounted on right and left spindles (only the right one 18 being shown), being connected to and extending outwardly from respective opposite sides of the frame 12. The baler has a tongue 20, being pivotally connected to the frame 12 and extending forwardly of the baler 10. When articulately connected at a hitch end 22 of its tongue 20 to the drawbar of a tractor (not shown), the baler 10 may be towed across a field.

The baler 10 further includes a fore-and-aft extending bale chamber or case 24 on the left side of the frame 12 and a feeder housing 26 transversely mounted along and above the frame 12 adjacent the right, inboard side of the bale case 24. A feeding mechanism 28 is mounted within the feeder housing 26 and adapted to convey crop material into the bale case 24 through an inlet feed opening 30 formed in the right inboard vertical side of the bale case 24. A pickup assembly 32 is mounted on the frame 12 forwardly of and below the feeder housing 26 and adapted to lift crop material from the field and deliver it to the feeding mechanism 28 within the feeder housing 26.

Mounted in the bale case 24 by a suitable roller/track support arrangement, such as illustrated and described in U.S. Pat. No. 3,059,569, for reciprocation longitudinally therein is a bale forming plunger 34 which is movable through a working stroke from a retracted position forwardly of the inlet feeding opening 30 to an extended position rearwardly of the opening 30, as shown in FIGS. 2 and 3, and then back to its retracted position for forming crop material conveyed into the bale case 24 through its inlet opening 30 into rectangular bales. As bales are formed in the bale case 24, they move progressively toward the rear end of the bale case 24. After each bale is completed, it is banded with a suitable tying medium and, subsequently, emerges from the rear or discharge end of the bale case 24.

For providing rotary power to the feeding mechanism 28, pickup 32 and plunger 34 as well as other operating mechanisms of the baler 10, a flywheel 36 is rotatably mounted at the forward end of the bale case 24 and connected with power transmitting components which interconnects the flywheel 36 to the various operating mechanisms. An input driveline, generally designated by number 38, being connected at its rear end to the baler flywheel 36, is adapted for connection at its forward end to the power takeoff (pto) shaft of the tractor (not shown) for rotation in unison therewith to supply rotary driving power to the flywheel 36.

Drive Means for the Plunger

Referring to FIGS. 2 and 3, it will be seen that the plunger 34 is reciprocably driven along its fore-and-aft path within the bale case 24 via its interconnection with a rotating crank arm 40 mounted on the output shaft 42 of a gearbox 44 mounted adjacent the forward end of the bale case 24. Such interconnection is provided by an elongated connecting rod 46. The rod 46 has a transversely-extending tubular sleeve 48 at its rear end which is pivotally journalled about a transverse bearing shaft 50 mounted on the plunger 34. At its forward end, the connecting rod 46 is pivotally connected by a pin 52 to the outer, free end of the rotating crank arm 40. The rotary motion of the crank arm 40 and the output shaft 42 of the gearbox 44 is received from the flywheel 36 which is mounted on an input shaft 54 of the gearbox 44. Thus, to reciprocably drive the plunger 34 through its forward and rearward strokes, the circular motion at the forward end of the connecting rod 46 is translated into fore-and-aft reciprocatory linear motion at the rear end of the rod 46, with the rear end of the rod pivoting vertically about the horizontal axis defined by the plunger transverse bearing shaft 50 as the plunger 34 is reciprocably moved within the bale case 24.

Arm Means for the Plunger

For facilitating accurate guidance of the plunger 34 along its support tracks during its reciprocatory movement within the bale case 24, a fore-and-aft extending arm assembly is provided, being generally indicated by numeral 56.

The assembly 56 includes a fore-and-aft extending arm 58 being fixed at its rear end to the right upper portion of the plunger 34 and extending forwardly therefrom. The securement of the arm 58 to the plunger 34 is additionally strengthened by a vertical side brace 60 and a horizontal diagonal brace 62 which rigidly interconnect the arm 58 and plunger 34.

The assembly 56 further includes a pair of orthogonally arranged bearing rollers 64,66 being rotatably mounted at the forward end of the arm 58. Roller 64 is rotatably mounted on a stub shaft 68 which is fastened to a U-shaped bracket 70 attached to the forward end of the arm 58 so as to orient the shaft 68 in a vertical direction. Thus, the roller 64 is generally disposed in a horizontal plane and rotatably about a vertical axis defined by its shaft 68. Roller 66 is rotatably mounted on a stub shaft 72 which is fastened to a U-shaped bracket 74 attached to the arm 58 adjacent the bracket 70 so as to orient the shaft 72 in a horizontal direction. Thus, the roller 66 is generally disposed in a vertical plane and rotatable about a horizontal axis defined by its shaft 72.

Improved Rail Assembly for Guiding the Plunger Arm Means

An improved rail assembly is illustrated in FIGS. 2 through 4, being designated generally by numeral 76. The rail assembly 76 provides accurate guidance of the arm 58 and thereby the plunger 34 throughout its reciprocatory movement within the bale case 24. Particularly, the improved rail assembly 76 adopts a novel method and arrangement for presetting the path of reciprocatory movement of the plunger 34 within the bale case 24 so as to insure that the plunger will travel in conformity with its natural straight line path and thereby in substantially parallel alignment with the reciprocatory motion transmitted thereto by the drive rod 46, whereby the deleterious effects described hereinabove which would otherwise result as a consequence of binding or lateral turning of the plunger during its reciprocatory movement are avoided.

The rail assembly 76 preferably includes a series of elongated guide rails 78,80,82 and means for adjustably fastening the respective rails to adjacent portions of the top wall 84 and inboard side wall 86 of the bale case 24. The rails are each right-angle shaped in cross-section and of a length somewhat greater than the length of the stroke of the plunger 34. The rails 78,80 may take a one piece unitary form, however, preferably they are two separate rails.

The particular improvement incorporated by the rail assembly 76 resides in the adjustability of the position of the inner rail 78. The inner rail 78 may be adjusted to a position along the bale case 24 which defines a path parallel to the straight line path which the plunger 34 naturally wants to follow during its reciprocatory movement within the bale case 24. In one prior art arrangement shown in FIG. 5 (wherein parts similar to those shown in FIG. 4 have the same reference numbers), the adjustment was just the opposite, that is, the plunger path must conform to a predetermined path defined by an inner rail 88 fixed to the side wall 86 of the bale case 24. In another prior art arrangement illustrated in FIG. 6 of U.S. Pat. No. 3,115,823, the plunger path must conform to a predetermined path defined by an inner rail being fixed to the top wall of the bale case and disposed parallel to the bale case sidewall. In both of these prior art rail arrangements, the reciprocatory straight line path which the plunger would naturally follow was not taken into consideration or used as the frame of reference in arriving at the position in which the guide rail was fixed to either the bale case side or top wall. Thus, the path established by the prior art rail assemblies ordinarily would not conform exactly to the natural straight line path that the plunger wanted to take.

As seen in FIGS. 3 and 4, the means for adjustably fastening the inner rail 78 to the bale case top wall 84 includes a series of four fore-and-aft spaced, transversely-elongated slots 90 formed in the top wall 84 and a fastener in the form of a bolt 92 received through each of the slots 90 and threaded into each of a series of correspondingly fore-and-aft spaced threaded bores formed in the horizontal elongated portion 94 of the inner rail 78. A lock washer 96 is disposed between the head 98 of the bolt 92 and the bale case top wall 84. The head of each of the bolts 92 and each of the washers 96 are not shown in FIG. 3 in order that the slots 90 may be clearly seen.

To adjust the position of the inner rail 78 so that its depending vertical portion 100 defines a path along which the horizontal roller 64 will run that is substantially parallel to the natural straight line path the plunger 34 wants to follow, each of the bolts 92 are loosened slightly and the plunger 34 is moved to the rearward end of its stroke where the horizontal roller 64 of the plunger arm assembly 56 will be located contiguous with a portion of the inner rail 72 adjacent the rearmost one of the bolts 92. The inner rail 78 is then moved laterally to bring the vertical portion 100 of the rail 78 into contact with the roller 64 and the rearmost one of the bolt 92 is tightened to clamp the horizontal portion 94 of the inner rail 78 to the bale case top wall 84 at this location. Next, the plunger 34 is moved incrementally forwardly until the horizontal roller 64 is located contiguous with the next rearwardmost one of the bolts 92. The inner rail 78 is again laterally moved to bring its vertical portion 100 into contact with the horizontal roller 64 and the respective one of the bolts 92 is tightened down to clamp the respective horizontal portion 94 of the inner rail 78 to the bale case top wall 84 at this location. Successively, the plunger 34 is twiced incrementally moved forwardly to locate the horizontal roller 64 proximate the next forwardmost and forwardmost locations of the remaining two of the bolts 94 with the latter bolts being tightened down to clamp the rail 78 to the bale case top wall 84 at each of these locations after the rail vertical portion 100 is brought into contact with the roller 64 at each location.

Once the position of the inner rail 78 has been fixed to the bale case top wall 84 through performance of the steps just described, the outer rail 80 may be laterally moved toward the inner rail 78 to provide a predetermined dimension between the rails 78,80 within which the roller 64 is confined. Then, a series of four bolts 102 which extend through transversely elongated, fore-and-aft spaced slots 104 formed in the top wall 84 of the bale case 24 and are threaded into corresponding bores formed in the horizontal portion 106 of the outer rail 80, as seen in FIGS. 3 and 4, are tightened down to clamp the rail 80 to the bale case top wall 84.

The head of each of the bolts 102 and each of the lock washers 103 disposed between the head and the top wall 84 of the bale case 24 are omitted in FIG. 3 in order that the slots 104 may be clearly seen.

Also, as seen in FIGS. 2 and 4, a series of four fore-and-aft spaced openings are formed in the inboard side wall 86 of the bale case with a nut 108 being welded to the exterior face of the side wall 86 adjacent each of the openings such that a threaded bore defined through the nut 108 is aligned with each of the side wall openings. The threaded stem 110 of a bolt 112 having a locking nut 114 threaded thereon threadably extends through the welded nut 108 and side wall opening. Once the position of the inner rail 78 is fixed on the bale case top wall 84 as described above, each of the bolts 112 are turned to bring its inner end 116 into contact with the vertical portion of the inner rail 78 to thereby provide lateral support for the rail 78 opposite the roller 64; then, each locking nut 114 is tightened down against its respective welded nut 108.

Prior to performance of the above-described steps for adjusting the position of the inner rail 78, the lower rail 82 is vertically adjusted to position it at a predetermined displacement below the horizontal portion 94 of the inner rail 78 and a series of five bolts 118, which extend through corresponding vertically-elongated, fore-and-aft spaced slots 120 in the sidewall 86 of the bale case 24 and are threaded into corresponding bores formed in the vertical portion 122 of the lower rail 82 as seen in FIGS. 2 and 4, are tightened down to clamp the rail 82 to the bale case side wall 86. The head of each of the bolts 118 and each of the lock washers 119 disposed between the head and the side wall 86 of the bale case 24 are omitted in FIG. 2 in order that the slots 120 may be clearly seen. The vertical roller 66 is thus confined between the rails 78,82 with the path defined thereby being parallel to the top wall 84 of the bale case 24, such as is the case in the prior art rail arrangement illustrated in FIG. 5. Any warpage which may be present in the top wall 84 of the bale case 24 which will cause slight vertical pivoting or tilting of the plunger 34 and its arm assembly 56 during the reciprocatory movement thereof will not deleteriously effect the pivotal connection between the connecting rod transverse sleeve 48 and the plunger transverse bearing shaft 50 since the axis of such pivoting will coincident with the horizontal axis defined by the shaft 50.

It is thought that the invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. In a baler having a fore-and-aft extending bale case, drive means on said baler, a plunger mounted within said bale case for reciprocatory fore-and-aft movement therein, rod means operatively interconnecting said drive means to said plunger so as to transmit reciprocatory motion from said drive means to said plunger for driving the same, arm means fixed to said plunger and movable therewith, said arm means including at least first and second rollers mounted thereon, said first roller rotatable about a vertical axis and said second roller rotatable about a horizontal axis, and an improved assembly for guiding said arm means and thereby said plunger throughout its reciprocatory movement within said bale case, said improved assembly comprising:

fore-and-aft extending rail means including at least first and second rail members mounted on said bale case for contact, respectively, with two opposing sides of said first roller, and a third rail member mounted on said bale case for contact with one side of said second roller for guiding said arm means during its reciprocatory movement with said plunger; and lateral adjustment means including a series of fore-and-aft spaced apart fasteners interconnecting said first and second rail members to said bale case so as to facilitate lateral adjustment thereof to, and then attachment thereof at, a position on said bale case in parallel correspondence with the reciprocatory path of said plunger.

2. A baler as recited in claim 1, wherein:
   said lateral adjustment means includes first and second series of fore-and-aft spaced apart slots formed in said bale case which receive and allow movement of said fasteners therealong for facilitating individual adjustment, respectively, of said first and second rail members to said position on said bale case.

3. A baler as recited in claim 2, further including:

vertical adjustment means including a series of fore-and-aft spaced apart fasteners interconnecting said third rail member to said bale case so as to facilitate vertical adjustment thereof to, and then attachment thereof at, said position on said bale case in parallel correspondence with the reciprocatory path of said plunger.

4. A baler as recited in claim 3, wherein:

said vertical adjustment means includes a series of fore-and-aft spaced slots formed in said bale case which receive and allow movement of said fasteners therealong for facilitating adjustment of said third rail member to said position on said bale case.

5. A baler as recited in claim 4, wherein:

said lateral adjustment means further includes a plurality of fore-and-aft spaced apart adjustment members fixed to said bale case and individually selectively movable laterally into engagement with said first rail member to fix its location in one lateral direction.

6. In a baler having a fore-and-aft extending bale case, drive means on said baler, a plunger mounted within said bale case for reciprocatory fore-and-aft movement therein, rod means operatively interconnecting said drive means to said plunger so as to transmit reciprocatory motion from said drive means to said plunger for driving the same, arm means fixed to said plunger and movable therewith, said arm means including at least a first roller mounted thereon and rotatable about a vertical axis, and an improved assembly for guiding said arm means and thereby said plunger throughout its reciprocatory movement within said bale case, said improved assembly comprising:

fore-and-aft extending rail means including at least first and second rail members mounted on said bale case for contact, respectively, with two opposing sides of said first roller for guiding said arm means during its reciprocatory movement with said plunger; and lateral adjustment means including a series of fore-and-aft spaced apart fasteners interconnecting said first and second rail members to said bale case so as to facilitate lateral adjustment thereof to, and then attachment thereof at, a position on said bale case in parallel correspondence with the reciprocatory path of said plunger.

7. A baler as recited in claim 6, wherein:

said lateral adjustment means includes first and second series of fore-and-aft spaced apart slots formed in said bale case which receive and allow movement of said fasteners therealong for facilitating individual adjustment, respectively, of said first and second rail members to said position on said bale case.

8. A baler as recited in claim 7, further including:

a second roller mounted on said arm means and rotatable about a horizontal axis; and said improved assembly further including a third rail member mounted on said bale case for contact with said one side of said second roller for guiding said arm means during its reciprocatory movement with said plunger.

9. A baler as recited in claim 8, further including:

vertical adjustment means including a series of fore-and-aft spaced apart fasteners interconnecting said third rail member to said bale case so as to facilitate vertical adjustment thereof to, and then attachment thereof at, said position on said bale case in parallel correspondence with the reciprocatory path of said plunger.

10. A baler as recited in claim 9, wherein:

said vertical adjustment means includes a series of fore-and-aft spaced slots formed in said bale case which receive and allow movement of said fasteners therealong for facilitating adjustment of said third rail member to said position on said bale case.

11. A baler as recited in claim 10, wherein:

said lateral adjustment means further includes a plurality of fore-and-aft spaced apart adjustment members fixed to said bale case and individually selectively movable laterally into engagement with said first rail member to fix its location in one lateral direction.

* * * * *